United States Patent [19]

Stixrud

[11] 4,161,716

[45] Jul. 17, 1979

[54] VERY LOW FREQUENCY SONOBUOY (VLF SONOBUOY)

[75] Inventor: Thomas E. Stixrud, San Diego, Calif.

[73] Assignee: The United States of America as represented by the Secretary of the Navy, Washington, D.C.

[21] Appl. No.: 861,156

[22] Filed: Dec. 16, 1977

[51] Int. Cl.² .......................... B63B 21/52; H04R 1/44
[52] U.S. Cl. ............................................ 340/2; 9/8 R; 340/8 S
[58] Field of Search ..................... 340/2, 8 S; 9/8 R

[56] References Cited

U.S. PATENT DOCUMENTS

| | | | |
|---|---|---|---|
| 3,204,708 | 9/1965 | Berne | 9/8 R |
| 3,295,489 | 1/1967 | Bossa | 9/8 R |
| 3,711,821 | 1/1973 | Dale et al. | 340/2 |
| 3,992,737 | 11/1976 | Duel et al. | 340/2 |

*Primary Examiner*—Richard A. Farley
*Attorney, Agent, or Firm*—Richard S. Sciascia; Ervin F. Johnston; Thomas Glenn Keough

[57] ABSTRACT

An apparatus hydromechanically decouples a hydrophone arrangement disposed in a water medium from the effects of current, wind and surface wave action. A first float carrying a transmitter-antenna assembly extends through the water-air interface and is tethered to an auxiliary float which buoyantly supports the hydrophone arrangement. A line, hundreds or thousands of feet long, is suspended by the auxiliary float and terminates in a sonobuoy tube at a predetermined depth. From the tube the hydrophone arrangement and a high pressure float are pulled out by a weighted nose portion. After the hydrophone arrangement, high pressure float and a length of line are pulled from the tube, a weak link between the hydrophone arrangement and nose portion snaps allowing the weighted nose to sink. The high pressure float has sufficient buoyancy to support the hydrophone arrangement and a portion of the length of line causing it to assume a cantenary configuration. The combination of the tether, the entrained mass of the tube and the cantenary hydromechanically decouples the hydrophone arrangement from the effects of current, wind, and surface wave action acting on the other components of the sonobuoy.

11 Claims, 4 Drawing Figures

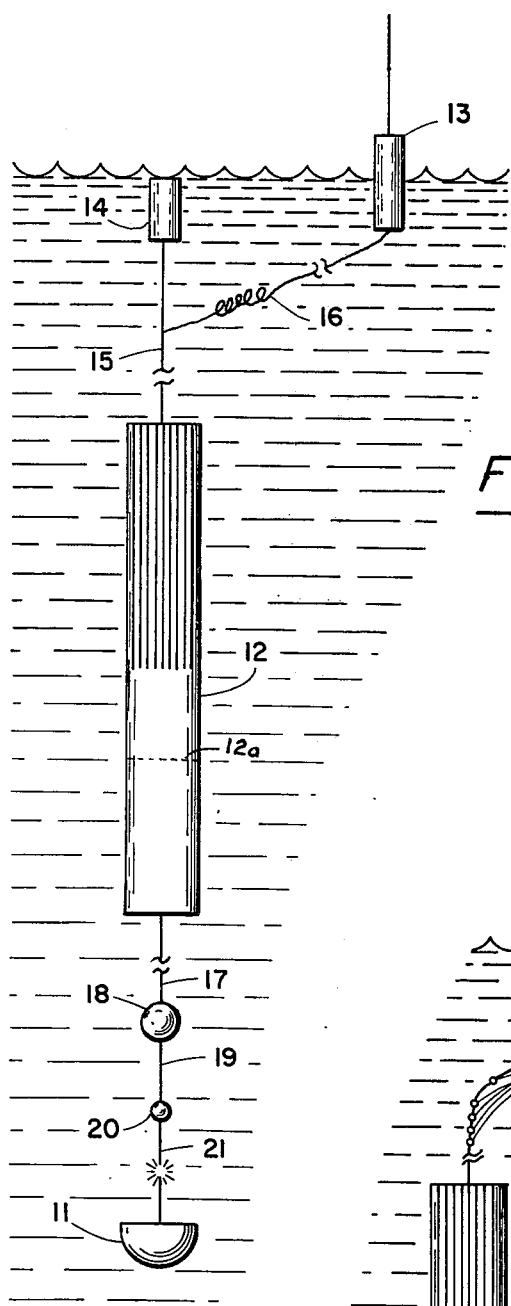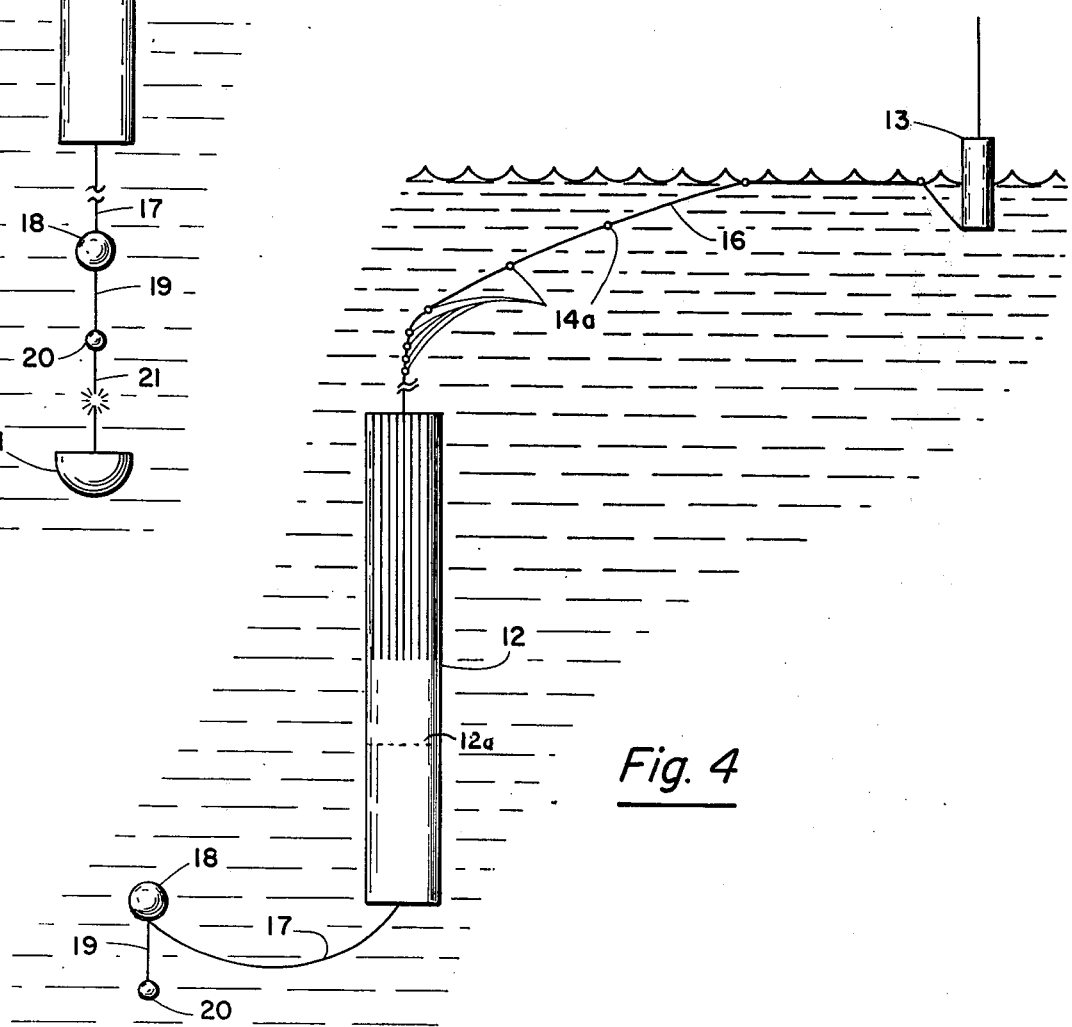

VERY LOW FREQUENCY SONOBUOY (VLF SONOBUOY)

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Sonobuoys and related seismic sensing devices have been in use for some time to sense acoustic phenomena of interest. A common design suspends a hydrophone from a spar buoy like float which also supports a transmitter-antenna combination. Signals representative of impinging acoustic energy on the hydrophone are transmitted to a distant monitoring station for appropriate data processing. This design provided acceptable performance in the audiofrequency range under calm conditions. An example of this type of conventional system is disclosed in the U.S. Pat. No. 3,982,222 entitled "Deep Hydrophone String" and issued on Sept. 21, 1976 to Robert J. Urich. Although this design calls for the lower end of the array being achored, fluctuations from the buoyant member will induce accelerations and pressure variations at the individual hydrophone elements creating what might be an unacceptable signal-to-noise ratio. The objectionable noise is the result of mechanical disturbances being transmitted to the hydrophone elements which, in turn, create representative spurious signals to be amplified. The objected-to disturbances are largely the product of the buoyant member's reacting to the effects of current, wind and surface wave action. These disturbances cannot be anticipated to allow their being compensated for in a sophisticated data processing technique, since they are extremely variable. For example, with the wind, waves and current all going the same way a certain pattern of mechanical disturbances is created. However, when the current is perpendicular or at some angle to the direction of the waves and the wind is from still another direction, a rigidly suspended hydrophone element will produce totally dissimilar spurious signals.

The self-propelled array system disclosed in U.S. Pat. No. 4,004,265 issued to Thomas E. Woodruff, et al on Jan. 18, 1977 seeks to avoid the generation of spurious signals due to the interaction of a transmitter float. Their plan is to sink the array and anchor it on the bottom while relying on other means for deploying it in a more or less horizontal plane. However, certain places in the ocean are much too deep for such a buoying scheme or tactical expediency may dictate that a float supported array is the better choice.

The subsurface system of U.S. Pat. No. 3,818,523 issued to Steven L. Stillman, Jr. on June 25, 1974 is another noteworthy attempt to provide for increased reliability. This moored system actually takes advantage of the ocean's currents to submerge or refloat the sonobuoy package. In one modification a portion of his tethering cable is made buoyant. This must necessarily reduce the transmission of hydromechanical disturbances to the hydrophone elements although it appears that the purpose of such a modification is to get the cable off the ocean's floor.

Thus, from the foregoing it is apparent that there currently exists in the state of the art a continuing need for an unmoored hydrophone arrangement which hydromechanically decouples a suspended hydrophone arrangement from the effects of current, wind and surface wave action.

SUMMARY OF THE INVENTION

The present invention is directed to providing an apparatus for hydromechanically decoupling a hydrophone arrangement disposed in a water medium from the effects of current, wind and surface wave action. A transmitter-antenna assembly carried on a float extends through the water-air interface for transmitting signals representative of impinging acoustic energy on the hydrophone. An auxiliary float is configured to lie at and below the water-air interface for buoyantly supporting the hydrophone arrangement and is tethered to the transmitter-antenna float. A long line is connected to the auxiliary float and the hydrophone arrangement for suspending the hydrophone arrangement well below the water-air interface. A sonobuoy tube, originally containing all the elements of the apparatus is carried on the line near the hydrophone arrangement for damping mechanical disturbances. A high pressure float having a buoyancy for supporting the hydrophone and a portion of the line, forms a cantenary in the line after a weighted nose portion has pulled it from the cannister and separated from it.

OBJECTS OF THE INVENTION

It is an object of the invention to provide an improved sonobuoy.

Another object of the invention is to provide an apparatus by which the sensor elements of a sonobuoy are decoupled from the influences of current, wind and surface wave action.

Still another object is to provide a sonobuoy arrangement contained within a sonobuoy tube prior to deployment.

Yet another object is to provide a sonobuoy having a transmitting-antenna float extending through the water-air interface being tethered to an auxiliary float disposed at and below the water-air interface to aid in the hydromechanical decoupling of a hydrophone arrangement.

A further object is to provide a sonobuoy arrangement which positions the sonobuoy tube near the hydrophone arrangement to aid in the damping of mechanical disturbances.

Still another object is to provide a sonobuoy system that locates the sensor elements deep within the ocean suspended by a high pressure float supported cantenary.

Yet still another object of the invention is to provide a sonobuoy arrangement that combines tethered, separated floats, the entrained mass of a water filled tube near the hydrophones and a cantenary support for hydromechanically decoupling a hydrophone arrangement from the effects of current, wind and surface wave action.

These and other objects of the invention will become more readily apparent from the ensuing specification when taken with the drawings.

BRIEF DESCRIPTION OF THE DRAWINGS

FIG. 3 represents the full extension of the sonobuoy and the separation of the weighted nose portion.

FIG. 4 depicts a modification of the inventive concept and the hydrophone arrangement extended by the high pressure float and cantenary.

DESCRIPTION OF THE PREFERRED EMBODIMENTS

Figure 1:
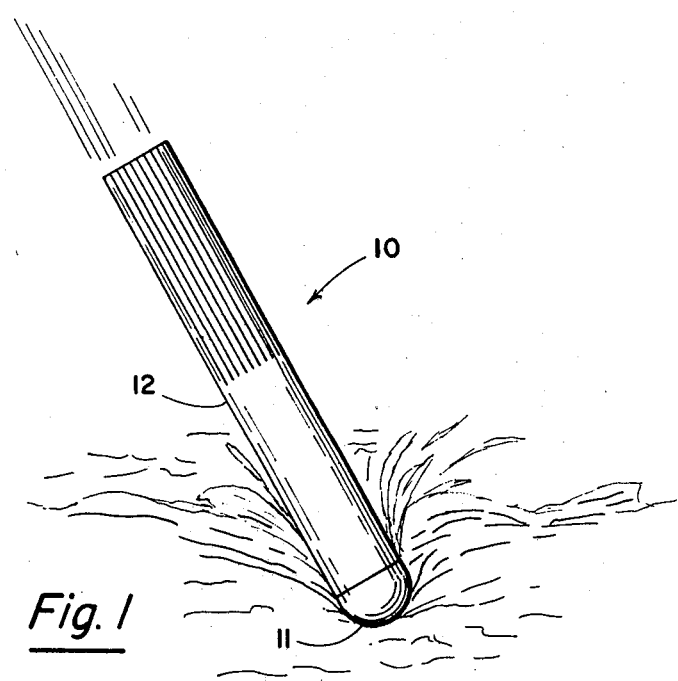
FIG. 1 depicts the deployment of a sonobuoy fabricated in accordance with the teachings of this invention.
Figure 2:
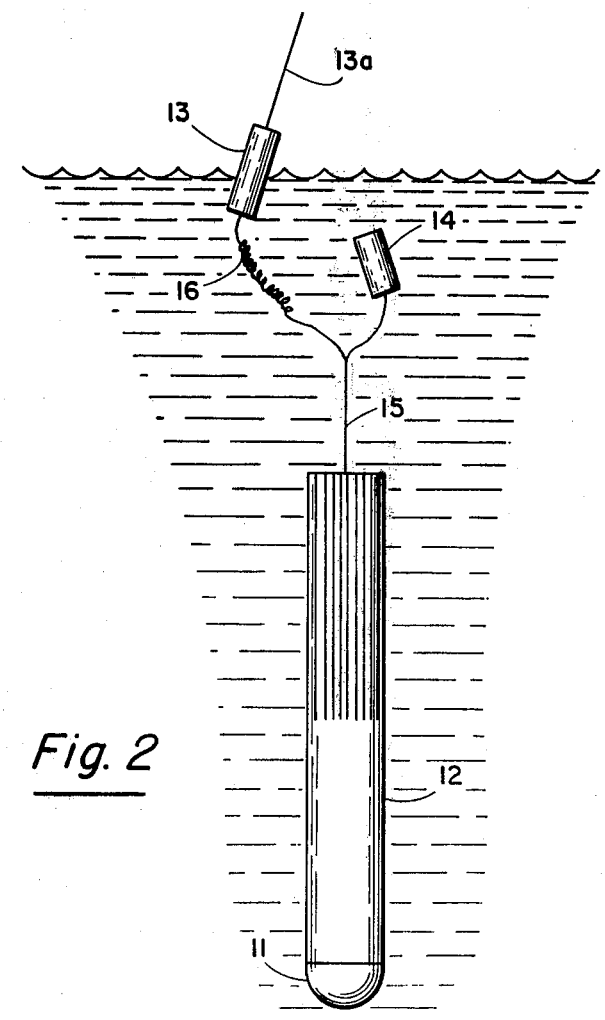
FIG. 2 shows the initial stages of release of two floats.

Referring now to FIG. 1 of the drawings, a sonobuoy 10 is shown during an initial stage of deployment as it penetrates the water-air interface. A weighted nose portion 11 is shaped to penetrate the water and at the opposite end of a sonobuoy tube 12, fluted surfaces tend to act as vanes to maintain a proper orientation.

As the sonobuoy continues sinking, a transmitter-antenna float 13 is released from the aft end of the sonobuoy. A light stiff wire antenna 13a has a minimum drag in high winds and serves to relay data to a remote station. A variety of transmitters and antennas are well established in the art and a routineer could choose from them to practice this invention.

An auxiliary float 14 also is deployed from the sonobuoy and pulls a suspension line 15 from within the sonobuoy tube. Between float 13 and float 14, approximately 150 feet of coiled line 16 tethers them together. The tether line is held coiled by a mild adhesive which releases coils as the floats are separated by wind, waves, etc.

Since the antenna float extends through the water-air interface to enable the transmission of signals representative of impinging acoustic energy, the tether line functions to block the transmission of mechanical disturbances from the rest of the elements of the sonobuoy. These disturbances are caused as the transmitter-antenna float responds to wind, surface currents and surface waves. Wind, in particular, will rock the transmitter-antenna float violently and heaving waves bob it about.

While the transmitter-antenna float is designed to extend through the water-air interface, the auxiliary float is sized to provide buoyant support for the rest of the elements of the sonobuoy and to come to the surface only in the wave trough. That is to say, it has only a few ounces of positive buoyancy so that it will ride below and at the water-air interface. This lends stability to the remainder of the sonobuoy elements, as will be elaborated on below. Giving both of the floats a streamlined configuration further helps reduce their reaction to the unstabilizing effects of high sea states, winds and currents.

The suspension line 15 can be any length, one tested had a length of over one thousand feet. Looking to FIG. 3, at the 1,000 feet level downward travel of the sonobuoy is arrested and it is suspended. A traverse wall 12a is provided with several small openings, not shown, to allow trapped air to escape. The wall does, however, give the tube a damping capability. This capability is largely attributed to a large water mass entrained by the wall within the sonobuoy tube.

When downward motion of sonobuoy tube 12 is arrested, the weighted nose portion falls out or is otherwise suitably released. In so doing, it pulls out a section of weighted line 17, and a high pressure float 18, coupled via a line 19 to a hydrophone arrangement 20. High pressure floats are commonplace in the state of the art and hydrophone arrangements, be they single elements or arrays of elements, are well known.

A weak link 21 couples the hydrophone arrangement to the weighted nose portion so that when elements 17 through 20 have been fully withdrawn and extended, the weighted nose portion draws the weak link taut, and snaps it allowing the weighted nose portion to sink by itself. This being done, the buoyancy of the high pressure float is of such a magnitude as to support the hydrophone arrangement and a portion, preferably about one-half, of the weighted line 17 to form the line into a cantenary with the hydrophone arrangement being supported by the high pressure float, see FIG. 4.

In FIG. 4, a modification of the auxiliary float is shown. A number of small floats 14a are disposed along the length of line 16 for the same purpose as float 14. There are a number of floats 14a in a short length to provide the vertical support for the remainder of the sonobuoy elements with the spacing between adjacent floats 14a becoming greater and greater as antenna float 13 is approached. This arrangement of the small floats helps keep them below or at the trough of the waves to reduce the problems associated with heave, wind, etc.

The embodiment of FIG. 4 depicts the sonobuoy in a condition where the wind is from left to right and, therefore, antenna float 13 appears to be drifting to the right. Current is from right to left so that the cantenary of line 17 suspends the hydrophone arrangement to the left of the sonobuoy tube. This being the case, the length of tether line 16, the mass of the entrained water in sonobuoy tube 12 and the cantenary of line 17 reduce to a minimum the mechanical influences of the hydrophone arrangement. In particular, the cantenary has a resonant frequency that is a small fraction of the higher wave frequencies so that residual surface motions are severely damped and become insignificant as a self noise source. The use of the entrained water mass in the sonobuoy tube near the almost neutrally buoyant hydrophone arrangement, inhibits acceleration due to surface heave and strumming before these influences can possibly reach the hydrophone arrangement. Finally, line 16 prevents the transmission of any heaving or rocking motions from the transmitter-antenna float from reaching the hydrophone arrangement.

At this point it may be well to mention that metallic or fiber optic conductors of electromagnetic energy are contained within the lines 16, 17 and 19. Also discussion regarding necessary power sources, preamplifier stages, etc. have been dispensed with to avoid belaboring the obvious.

Obviously, many modifications and variations of the present invention are possible in the light of the above teachings, and, it is therefore understood that the invention may be practiced otherwise than as specifically described.

What is claimed is:

1. An apparatus for hydromechanically decoupling a hydrophone arrangement disposed in a water medium from the effects of current, wind and surface wave action comprising:

means extending through the water-air interface for transmitting signals representative of impinging acoustic energy on the hydrophone arrangement;

means configured to lie at and below the water-air interface for buoyantly supporting the hydrophone arrangement;

means coupled between the transmitting means and the buoyantly supporting means for permitting the separation thereof;

means connected to the buoyantly supporting means and the hydrophone arrangement for suspending the hydrophone arrangement below the water-air interface;

means carried on the suspending means near the hydrophone arrangement for damping the effects of wind and surface wave action therefrom;

means mounted on the suspending means for forming a catenary thereof;

means connected to the suspending means for ensuring the deployment of the aforestated means; and the suspending means including a weak link portion connected to the deployment ensuring means to allow the separation thereof and the subsequent creation of a catenary in the suspending means by the catenary forming means.

2. An apparatus according to claim 1 in which the damping means is located relatively near the hydrophone arrangement as compared to its separation from the buoyantly supporting means.

3. An apparatus according to claim 2 in which the permitting means is a tether to allow the relative displacements of both the transmitting means and the buoyantly supporting means as they separately respond to the effects of current, wind and surface wave action.

4. An apparatus according to claim 3 in which the buoyantly supporting means is a single float configured and sized to lie at and below the water-air interface.

5. An apparatus according to claim 4 in which the damping means is a tube sized to contain the aforestated means before deployment.

6. An apparatus according to claim 5 in which the deployment ensuring means is a weighted nose portion for locating the hydrophone arrangement at a preestablished depth.

7. An apparatus according to claim 6 in which the cantenary forming means is a float fabricated to resist the ambient pressures and sized to buoy the hydrophone arrangement and a portion of the suspending means to assure the creation of the catenary.

8. An apparatus according to claim 3 in which the buoyantly supporting means is a plurality of flotation elements mounted along a portion of the suspending means, the flotation elements are sized and disposed to locate the hydrophone arrangement below the water-air interface with some of the elements below the water-air interface and some at the water-air interface.

9. An apparatus according to claim 8 in which the damping means is a tube sized to contain the aforestated means before deployment.

10. An apparatus according to claim 9 in which the deployment ensuring means is a weighted nose portion for locating the hydrophone arrangement at a preestablished depth.

11. An apparatus according to claim 10 in which the cantenary forming means is a float fabricated to resist the ambient pressures and sized to buoy the hydrophone arrangement and a portion of the suspending means to assure the creation of the cantenary.

* * * * *